United States Patent [19]
Yamasaki

[11] Patent Number: 5,345,435
[45] Date of Patent: Sep. 6, 1994

[54] OPTICAL DISC AND METHOD FOR RECORDING ON OPTICAL DISC

[75] Inventor: Yoshimori Yamasaki, Kanagawa, Japan

[73] Assignee: Sony Corporation, Tokyo, Japan

[21] Appl. No.: 935,815

[22] Filed: Aug. 26, 1992

[30] Foreign Application Priority Data

Aug. 30, 1991 [JP] Japan ................................. 3-244784
Aug. 30, 1991 [JP] Japan ................................. 3-244785
Aug. 30, 1991 [JP] Japan ................................. 3-244786

[51] Int. Cl.$^5$ .................... G11B 13/00; G11B 7/007
[52] U.S. Cl. ............................... 369/275.3; 369/13; 369/275.1; 360/48
[58] Field of Search ................. 369/275.3, 100, 124, 369/32, 116, 178, 44.11, 275.1, 13; 360/32, 35.1, 114, 118, 48, 59, 77.11, 78.04, 78.11

[56] References Cited

U.S. PATENT DOCUMENTS

| | | | |
|---|---|---|---|
| 4,530,018 | 7/1985 | Hoshino et al. | 360/73 |
| 4,736,352 | 4/1988 | Satoh et al. | 369/275.3 |
| 4,750,059 | 6/1988 | Syracuse | 369/59 |
| 4,843,604 | 5/1989 | Fujiwara et al. | 369/116 |
| 5,155,714 | 10/1992 | Inoue | 369/275.3 |
| 5,159,650 | 10/1992 | Nishiwaki et al. | 369/44.11 |

FOREIGN PATENT DOCUMENTS

| | | |
|---|---|---|
| 0321027A3 | 6/1989 | European Pat. Off. |
| 0342624A3 | 11/1989 | European Pat. Off. |
| 0352104A2 | 1/1990 | European Pat. Off. |
| 0387052A3 | 9/1990 | European Pat. Off. |
| 0392020A1 | 10/1990 | European Pat. Off. |
| 0404942A1 | 1/1991 | European Pat. Off. |
| 0417858A1 | 3/1991 | European Pat. Off. |
| 0080256A3 | 6/1993 | European Pat. Off. |
| WO88/04824 | 6/1988 | PCT Int'l Appl. |

OTHER PUBLICATIONS

Hitachi Review, vol. 39, No. 5, Oct. 1990, Tokyo JP, pp. 273-276, XP000219776, S. Arai et al.: 'OD321 series 12 inch large capacity WORM optical disk drive.'
Transactions on the Institute of Electronics, Information and Communication Engineers of Japan, vol. E 74, No. 4, Apr. 1991, Tokyo, Japan, pp. 951-954, XP000241319, T. Maeda et al.: 'High speed, larger capacity optical disk using pit edge recording and MCAV method.'
IEEE Translation Journal of Magnetics in Japan, vol. 6, No. 8, Aug. 1991, New York, USA, pp. 709-716, XP000294993, S. Iwatsu et al.: 'A Study for high track density recording on magneto-optical disks.'
IEEE Translation Journal on Magnetics in Japan, vol. 5, No. 1, Jan. 5, 1990, New York, USA, pp. 79-86; H. Sukeda et al.: "High Speed Magnetic Field Modulation in Pit-edge Magneto-optic Recording II."
IEEE Translation Journal of Magnetics in Japan, vol. 26, No. 5, Sep. 1990, New York, USA, pp. 1903-1905; D. C. Cheng et al.: "Domain Edge Formation and Jitter Characteristics in Thermomagnetic Recording with Magnetic Field Modulation."
Patent Abstracts of Japan, vol. 16, No. 15 (P-1298), Jan. 14, 1992 & JP-A-32 32 140 (Nec Corp.).
Patent Abstracts of Japan, vol. 14, No. 332, (P-1077), Jul. 17, 1990 & JP21 10 844 (Ricoh Co. Ltd.).

*Primary Examiner*—Paul M. Dzierzynski
*Assistant Examiner*—Kim-Kwok Chu
*Attorney, Agent, or Firm*—Philip M. Shaw, Jr.

[57] ABSTRACT

An optical disc having a plurality of recording zones, each having $2^n$ tracks, with the recording capacity of each track in a given zone being equal and the recording capacity being different for each recording zone, and with a line recording density of each recording zone being approximately equal.

9 Claims, 8 Drawing Sheets

OPTICAL DISC AND METHOD FOR RECORDING ON OPTICAL DISC

BACKGROUND OF THE INVENTION

This invention relates to an optical disc having a large recording capacity and a high data accessing speed and interchangeable with a current type of optical disc, and a method for recording on the optical disc.

Heretofore, as a write-once or overwrite type data-recording optical disc, an optical disc of the CAV (constant angular velocity) system, in which the disc is rotated at a constant angular velocity, is employed for its superior accessing time and seek time. If the optical disc is used as a recording, medium for an electronic computer, for example, it is necessary to shorten the accessing time required for data recording/reproduction, that is, the data recording/reproduction need to be carried out at an elevated speed. As a measure of the recording capacity of the optical disc, the recording capacity per track is determined by the number of recordable marks at the inner most part of the recording region of the disc.

As a matter of fact, among the specifications for International Organization for Standardization for data-recording optical discs, there are ISO/IEC DP 10090 and ISO/IEC DIS 10089 for a 3.5 inch optical disc and a 5.25 inch optical disc, respectively.

According to the ISO/IEC DIS 10090-CCS system for the 3.5 inch optical disc, the optical disc has a recording capacity of 128 Mbytes per side by recording of 512 bytes per sector. With this optical disc, a large capacity of the recording information may be handled as compared to that handled by a magnetic disc. Among parameters for this system, the track pitch is 1.6 $\mu$m, while the reciprocal of the circumferential recording density is 1.0 $\mu$m/bit.

According to the ISO/IEC DIS 10089 system for the 5.25 inch optical disc, the optical disc has a recording capacity of 128 Mbytes per side by recording of 1K byte per sector and a recording capacity of 293M bytes per side by recording of 512 bytes per sector. With this optical disc, a large capacity of the recording information may be handled as compared to that handled by a magnetic disc. Among parameters for this system, the track pitch is 1.6 $\mu$m, while the reciprocal of the circumferential recording density is 1.0 $\mu$m/bit.

These recording data are recorded on the data-recording optical disc in accordance with a recording system which is a combination of the light modulation system and a mark length recording shown in FIG. 1.

Recently, newer electronic computers are capable of handling a large quantity of data at an elevated speed. This information processing capability of the electronic computer is effectively utilized for recording data of results of simulations of larger quantities calculated by the electronic computer on a recording medium while these results are displayed on a real-time basis on a display screen. For fully demonstrating the computer capability to the utmost extent in carrying out the above processing operations, a larger capacity of the optical disc is desired.

Meanwhile, with the CAV system optical disc capable of performing high-speed accessing, the maximum recording density is achieved at the inner most periphery of the disc. However, since the information is recorded by the CAV system on the tracks in their entirety with the same recording capacity for each track, the recording density at the radially outer disc region is lower than that at the radially inner disc region, as a result of which the total recording capacity is lower than that of the optical disc of the constant linear velocity (CLV) system.

OBJECT AND SUMMARY OF THE INVENTION

In view of the above-described status of the art, it is an object of the present invention to provide an optical disc in which the recording capacity per side may be increased easily without lowering the accessing speed in accordance with a new physical recording format.

Tn an optical disc in which plural tracks for recording information data are produced, according to the present invention, a recording region of the optical disc is subdivided into plural recording zones each having $2^n$ tracks, n being a natural number and, in one and the same recording zone, the recording capacity per track is equal and, in different recording zones, the recording capacity per track is different and the line recording density per recording zone is approximately equal.

As a concrete format, the pitch of recording tracks formed on the optical disc is selected to be narrower than 1.6 $\mu$m, a reciprocal of the line recording density of circumferential recording tracks is selected to be 1.0 to 0.7 $\mu$m/bit and a recording region on which information data are recorded is subdivided into 2 to 10 recording zones at intervals of plural tracks.

A recording method for recording information data in a recording region of an 3.5 inch optical disc in which plural recording tracks are formed includes setting the pitch of the recording tracks so as to be narrower than 1.6 $\mu$m, setting a reciprocal of the line recording density of circumferential recording tracks so as to be 1.0 to 0.6 $\mu$m/bit, and subdividing a recording region on which information data are recorded by an edge recording system into 2 to 10 recording zones at of plural tracks.

A method for recording information data in a recording region of an optical disc according to the present invention includes subdividing the recording region of the optical disc into plural recording zones each having $2^n$ tracks, n being a natural number, and recording the information data so that the recording capacity per track is equal in one and the same recording zone and the recording capacity per track is different while the line recording density in each recording zone is approximately equal in different recording zones.

In a method for recording data in a recording region of, for example, a 5.25 inch optical disc in which recording tracks are formed, the recording tracks are formed at a pitch narrower than 1.6 $\mu$m, a reciprocal of the line recording density of circumferential recording tracks is 1.0 to 0.7 $\mu$m/bit, and a recording region in which information data are recorded is subdivided into 2 to 10 recording zones at intervals of plural tracks.

In a method for recording data in a recording region of, for example, a 3.5 inch optical disc in which recording tracks are formed, the recording tracks are formed at a pitch narrower than 1.6 $\mu$m, a reciprocal of the line recording density of . circumferential recording tracks is 1.0 to 0.6 $\mu$m/bit, and a recording region in which information data are recorded by an edge recording system is subdivided into 2 to 10 recording zones at intervals of plural tracks.

The information data are recorded on the optical disc in accordance with a magnetic field modulating system, a mark length recording or an edge recording system, which are, respectively, a system consisting in changing the waveform rise and fall timings depending on the intensity of magnetism, a system consisting in inverting the level of the recording waveform and a system consisting in recording based on the rise and fall edges of a readout waveform of recording data during readout.

By performing recording in the above-described manner, when the recording region of the optical disc is subdivided into plural recording zones, the line recording density in the tracks of the inner most recording zone is rendered substantially equal to the line recording density in the tracks of the outer most recording zone. Besides, high-speed accessing may be achieved easily and the recording capacity per side may be increased significantly. Above all, by changing over the recording zones by a number equal to a power of 2 of the number of tracks, the recording zones may be changed over easily by using only several upper order bits of a digital discriminating signal if such discriminating signal is used. In this manner, a larger quantity of data may be recorded and/or reproduced stably and accurately by a simple technique without producing jitter.

With the optical disc according to the present invention, by maintaining interchangeability with the current optical disc, the number of items of modification may be diminished in the manufacture of optical discs to render the manufacture process of the optical disc compatible with that for a current optical disc to facilitate manufacture of the optical disc.

DETAILED DESCRIPTION OF THE PREFERRED EMBODIMENTS

In an optical disc and a method for recording on the optical disc according to the present invention, a recording region of the optical disc on which plural recording tracks are formed is subdivided into plural recording zones each having $2^n$ tracks, n being a natural number, i.e. a positive integer and recording is so made that the recording capacity per track is equal in one and the same recording zone while the recording capacity per track is different and the line recording density per recording zone is approximately equal in different recording zones, for increasing the recording capacity of the optical disc.

Figure 2:
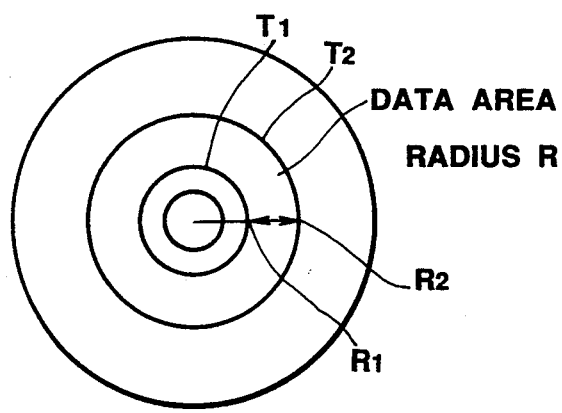
FIG. 2 is a schematic view showing an optical disc according to the present invention and the principle of the recording method for the optical disc.

The principle of a concrete physical format for implementing the above-mentioned optical disc and the recording methods therefor is explained by referring to FIG. 2.

FIG. 2 shows a physical format of an optical disc. The length of a track of an optical disc is expressed by the length of a circumference L. Thus the length of a track of an optical disc differs with the radius R of the optical disc, as shown by $$L = 2\pi R \quad (1)$$

The circumferential recording track with the radius R of the optical disc, having the above length, is divided into K sectors of equal length, that is the 1st sector or zero sector $S_O$ to $(k-1)$th sector $S_{k-1}$.

The total number of recording bits $M_R$ for the radius R of the optical disc is expressed by a product $m_R K$, where $m_R$ is the total number of recording bits per sector and K is the number of sectors in the above recording track. The reciprocal d of the recording density per track, or the length for a bit, is given by $$d = (2\pi R)/M_R \quad (2)$$

Thus, with the optical disc shown in FIG. 2, if the total number of bits per sector $M_R$ is the same from one track to another, the recording density of a track $T_2$ for the outer most radius $R_2$ of a recording region is decreased relative to that of a track $T_1$ for the inner most radius $R_1$ of the recording region by a ratio $R_1/R_2$. For inhibiting the loss at the outer most radius $R_2$ and maintaining the recording density, the number of sectors $K_2$ for the outer most radius is selected to be $(R_2/R_1)$ times the number of sectors $K_1$ for the inner most radius, as indicated by $$K_2 = K_1 \times R_2/R_1 \quad (3)$$

It is however apparent that controlling operations, such as switching controlling of the recording data frequencies, are increased in complexity as a result of subdivision of the data recording region. For reducing the complexity, it is favorable to subdivide the recording region ($R_2-R_1$) into equal parts. That is, the recording region ($R_2-R_1$) is subdivided into equal length parts ($R_2-R_1$)/N, where N is the number of recording zones.

With the number of recording zones N=2, and the number of sectors in a recording zone $Z_2$ equal to $K_1$, a boundary between the recording zones is set at a mid position ($R_2+R_1$)/2 between the inner most radius $R_1$ and the outer most radius $R_2$, so that, from the formula (3), the number of sectors $K_2$ for the recording zone $Z_2$ may be expressed by $$K_2 = K_1 \times (R_2+R_1)/(2 \times R_1) \quad (4)$$

By setting the numbers of sectors $K_1$ and $K_2$ in accordance with zone regions, the values of the recording density of two regions may be rendered approximately equal, so that a recording capacity of a larger volume than that achieved conventionally may be achieved with the limited data recording region.

The number of recording zones N of the optical disc is an integer not less than 2. Meanwhile, strictly speaking, a fractional number may occasionally be produced when the total number of tracks is divided by the number of recording zones N to find the number of tracks for each recording zone. In such case, adjustment for the tracks of the fractional number may be made at the outer most or last recording zone.

Figure 3:
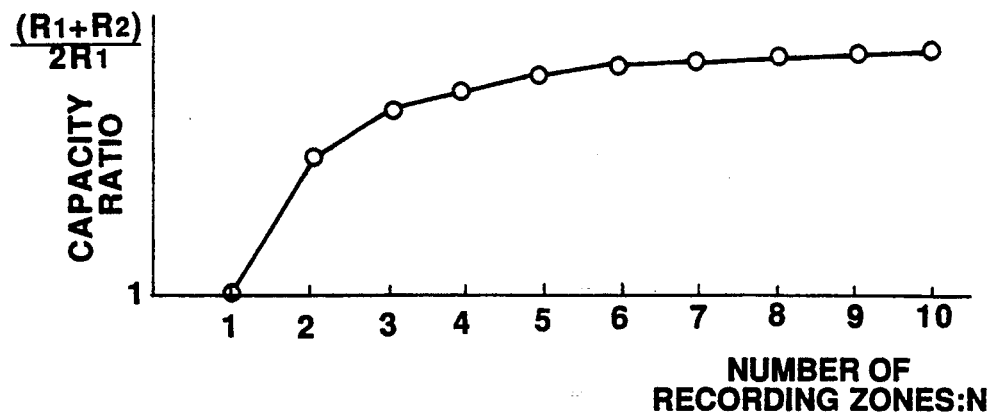
FIG. 3 is a graph showing the relation between the number of the subdivided recording zones of the optical disc in FIG. 2 and the recording capacity ratio.

The recording capacity of the optical disc of the present invention tends to be increased with an increase in the number of the recording zones N. Such a tendency may be demonstrated in the graph of FIG. 3 in which the abscissa indicates the increase in the ratio of the recording capacity with the conventional recording capacity being normalized to unity. Referring to FIG. 3, although the number of the sectors K actually assumes only an integer, the size of the optical disc is set so as to be arbitrary, the value of the number of sectors K is set to a constant value, and the ratio of the recording capacity is found by using the formula (4). It is seen from the graph of FIG. 3 that the ratio of the recording capacity is increased for the number of the recording zones of N=2 to 10 and that the ratio of the recording capacity is increased efficiently for the number of zones N=2 to 5.

Figure 4:
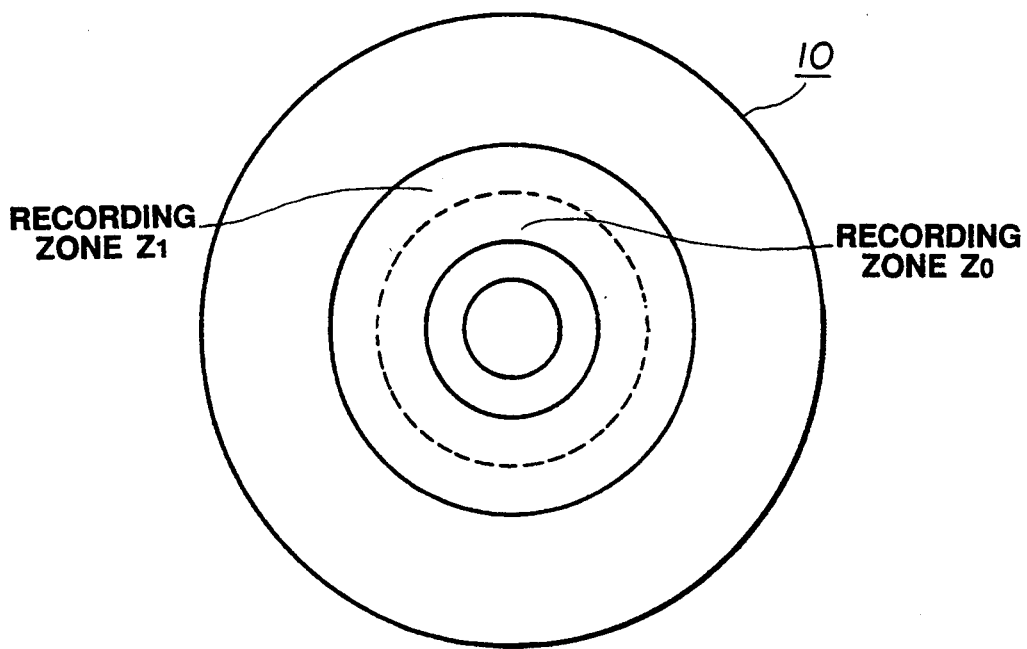
FIG. 4 is a schematic view showing a concrete example illustrating the principle of the optical disc according to the present invention.

A concrete example employing this principle is explained by referring to the optical disc shown in FIG. 4.

With the 5.25 inch optical disc 10 according to the above-mentioned ISO/IEC DIS 10089, the region delimited between the radius R=30 mm and R=60 mm is the recording region, with the track pitch being 1.6 μm. Thus the total number of tracks of the above-mentioned recording region of 30 mm is 18751.

In the present embodiment, the recording region of the optical disc 10 is subdivided into two by providing a boundary at a radius R=45 mm from the center of the disc, with the number of the recording zones N=2. The number of recording sectors per track in an inner most recording zone $Z_0$ is given by $K_1 = 17$ sectors, while the number of recording sectors per track in an outer most recording zone $Z_1$ is given from formula (4) by $K_2 = 17 \times (60+30)/(2 \times 30) = 25.5$ sectors. In the outer most recording zone $Z_1$, the circumferential recording track subdivided into $K_2 = 25$ equal length sectors. The total number of recording bits per sector $m_R$ is set to 1K bytes = 1024 bytes.

The number of tracks in the recording zone $Z_0$ is 9375 from a 0th track bearing a track number $T_O$ to a 9374th track bearing a track number $T_{9374}$. The reciprocal of the maximum recording density in the recording zone $Z_0$ is 1.02 μm/bit. Similarly, the number of tracks in the recording zone $Z_1$ is 9376 from a 9375th track bearing a track number $T_{9375}$ to a 18750th track track number $T_{18750}$. The reciprocal of the maximum recording density in the recording zone $Z_1$ is 1.04 μm/bit. The number of $\times$b bits in the sectors having the maximum recording density is 1360 bits for both of the zones $Z_0$ and $Z_1$.

If, with the optical disc thus subdivided according to recording zones, the information of 1K bytes may be recorded in each sector, the data recording capacity may be increased to 403M bytes from the data volume of 326M bytes according to the ISO/IEC DIS 10089 standard. By the above-described method, the value of the number of the recording zones resulting from the subdivision may be selected arbitrarily, so that the degree of freedom may be increased. Besides, substantially the same number of tracks may be set for each recording zone resulting from subdivision.

However, if the recording region is subdivided in this manner, it becomes necessary for the optical disc driving device to perform complex controlling operations, such as changing the frequency of recording data from one recording zone to another.

Thus the present invention proposes to subdivide the data recording region on the basis of the above principle for increasing the recording capacity of the recording region while lowering the complexity in the controlling operations.

With the optical disc 10 of the present invention, the recording region of the disc 10 is subdivided at an interval of $2^n$ tracks, where n is a natural number. By subdividing the optical disc in this manner, the recording region of the optical disc may be subdivided into plural recording regions at an interval of $2^n$ tracks, with the recording capacity per track being equal from track to track within the same recording zone and with the recording capacity per track being different from one recording zone to another, with the line recording density being approximately equal within the same recording zone. As a discriminating signal $ID_s$ of the optical disc 10, digital signals in binary representation for subdivision at intervals of $2^n$ tracks are advantageously employed.

Specifically, the total number of tracks on the optical disc is e.g. $32768 = 2^{15}$, the recording region of the disc is subdivided by four so that the number of tracks in each recording zone is $2^{13}$ (=8192), and the upper two bits of the 15 bits of the track address may be directly used as a zone address. The recording region of the data subdivided into four zones may be perpetually checked in accordance with the zone addresses of the upper two bits to facilitate the controlling operations. Although the number of tracks is usually not equal to $2^n$ and hence fractional tracks are produced, these fractional tracks can be adjusted by being included in the last recording zone.

The number of the recording zones N, obtained by subdividing the recording region of the optical disc 10, is not less than two, and may assume any value depending on the track pitch TP and the width of the data recording region $R_{DB}$, as described above. This is now elucidated hereinbelow.

The total number of tracks TN in the data recording region is given by $$TN = R_{DB}/TP \qquad (5)$$

If the recording region of the optical disc is subdivided so that each recording zone has a width $R_B$ and has $2^n$ tracks, the number of recording zones N (N=0, 1, 2, ..., N−1) is expressed by a quotient obtained by dividing the total number of tracks TN by the number of tracks in each recording zone, or $2^n$, or by a quotient $R_{DS}/R_B$.

On the other hand, the number of tracks in the outer most or last recording zone $Z_{N-1}$ is expressed by a sum of $2^n$ and a surplus obtained upon dividing the total number of tracks TN by $2^n$.

The reciprocal of the recording density on the inner most track $d_1$ is represented by the circumference of the inner most radius $R_1$, that is $2\pi R_1$, divided by the product of the total number of bits per sector and the number of sectors $K_1$ per track. The radius $R_m$ at a boundary position between the mth recording zone $Z_{m-1}$ (m=1, 2, ..., N−1) and the preceding recording zone is represented by the inner most radius $R_1$ added with a product of the number of track in each recording zone or $2^n$ track pitch and the number of recording zones (m−1).

In this manner, the optical disc has its data recording region subdivided into an N number of zones. The reciprocal of the recording density in the mth recording zone $Z_{m-1}$ of the optical disc has a value larger than the reciprocal of the recording density at the inner most region of the recording zone. At this time, the recording density of the mth recording zone $Z_{m-1}$ does not exceed the recording density at the inner most region. The maximum number of sectors at this time is represented by a quotient obtained by dividing $2\pi R_m$ by a product of the recording density of a recording track at a radius $R_m$ from the disc center and the total number of bits per sector. Putting this relationship into order, we obtain $$K_m = K_1 \times (R_m/R_1) \qquad (6)$$

using the above symbols, the total recording capacity is increased gradually with increase in the number of recording zones N, or with decrease in the number of bits n indicating the number of tracks. Thus the total recording capacity is expressed by a sum of an integration from m=1 to m=N of a product of the maximum number of sectors $K_m$ of the mth recording zone $Z_{m-1}$, the recording capacity per sector and the number of tracks in the recording zone $2^n$ and a product of the maximum number of sectors $K_n$ of the last recording zone $Z_{n-1}$, the recording capacity per sector and the number of fractional tracks corresponding to the surplus produced on dividing the total number of tracks TN by the track number $2^n$.

Figure 5:
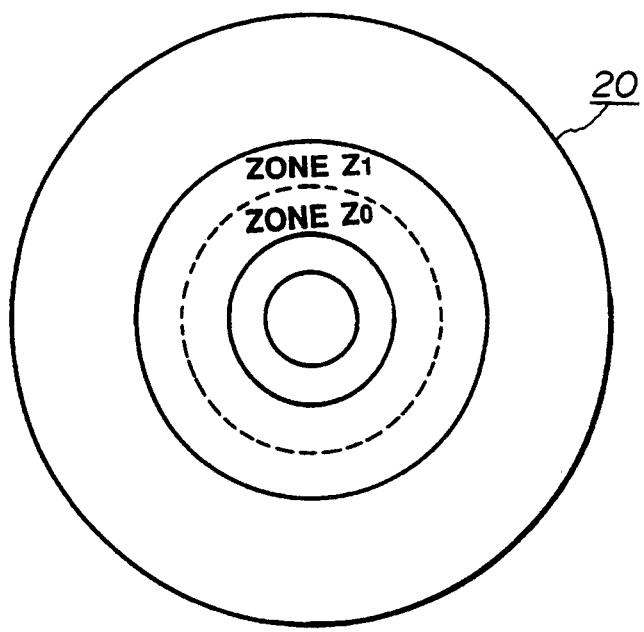
FIG. 5 is a schematic view showing a more concrete first embodiment of the optical disc according to the present invention.
Figure 6:
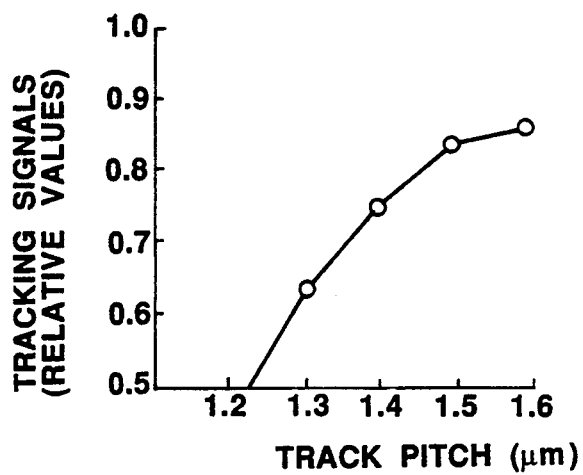
FIG. 6 is a graph showing the relation between the track pitch of the optical disc and the relative tracking signal quantity.
Figure 7:
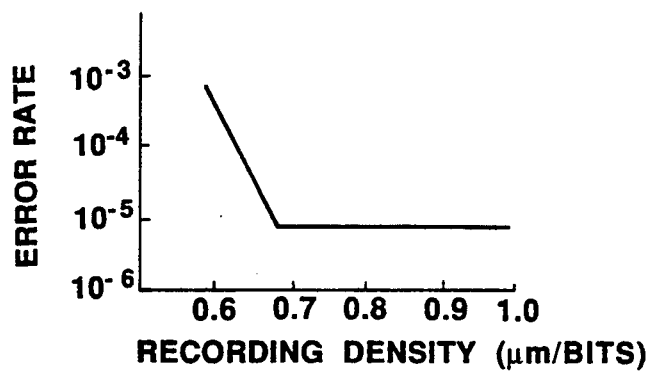
FIG. 7 is a graph showing the relation between the recording density of the optical disc and the error rate.

Based on the above-described principle, a first embodiment of the present invention is explained by referring to a schematic and graphs of FIGS. 5 to 7.

With the 5.25 inch optical disc according to the above-mentioned ISO standard ISO/IEC DIS 10089, the region of from a radius R=30 to 60 mm is a recording region, and a track pitch is set to 1.6 μm, while the reciprocal of the circumferential recording density is set to 1.0 μm/bit. Thus the number of tracks TN within the recording region with a width of 30 mm is 18751 tracks.

In the optical disc of the present invention, the track pitch is narrower by more than 1.6 μm as compared to that of the 5.25 optical disc of the customary ISO/IEC 10089 standard of the international Organization for Standardization, the reciprocal of the circumferential line recording density of the recording tracks is set to 1.0 to 0.7 μm/bit, and the recording region of the optical cal disc is subdivided into plural recording zones at an interval of a predetermined number of tracks, with the number of the recording zones being from 2 to 10 for approximately equating the recording density of the recording tracks from one recording zone to another. By the above-described construction and manner of recording, the recording capacity per track is rendered equal within a given recording zone, while the recording capacity per track is rendered different from one recording zone to another, the line recording density being approximately equal from one recording zone to another. The recording capacity of the CAV system optical disc may be increased significantly.

With the present 5.25 inch optical disc, the parameters other than those which have to be modified in connection with the above-specified parameters are set so as to be equal to those of the 5.25 inch optical disc of the conventional ISO/IEC 10089 standard of the International Organization for Standardization, for achieving improved interchangeability with the disc of the ISO/IEC 10089 standard.

As a concrete example, parameter setting for an optical disc of a continuous servo-tracking system of the ISO/IEC 10089 standard (CCS) is explained by giving numerical values.

As for the sector format of the optical disc 10 of the ISO/IEC 10089 standard, each sector is made up of an address part of 52 bytes, a flag part of 14 bytes, a data part of 1274 bytes and a buffer part of 20 bytes, totalling 1360 bytes. In the address part composed of 52 bytes, a region ID for recording the address information is made up of 3 bytes. The 3-byte region ID is composed of two bytes as a track number and one byte as a sector number. Data of the region ID are modulated in accordance with 2-7 modulation.

Among the current 5.25 inch optical disc according to the ISO/IEC 10089 standard of the International Organization for Standardization, there are an optical disc with 326M bytes per side and an optical disc with 293M bytes per side. The number of sectors per recording track in each recording zone except the inner most recording zone of the optical disc of the present invention is represented by a ratio of an inner radius to an outer radius of each recording zone from the center of the optical disc multiplied by the original number of sectors, so that the recording density will be approximately equal from one recording zone to another, as will be explained subsequently.

The above-mentioned region ID as well as the region CRC for recording error correction code for the region ID is written thrice within the address part.

As for this region ID, the maximum number of sectors per track is indicated using six bits for the sector number 17/31 for both of the two types of the current optical discs. However, with the above-mentioned format, the number of sectors is larger than the number of sectors per track of 17/31 of each of the above-mentioned two types of the optical disc. In some zones, 6 bits indicating 64 reserved for sector number indication may be exceeded. For this reason, the 2 bits of the ID field for sector number indication are not used as above, but are used for sector number indication, so that the sector number may be indicated by a total of 8 bits for up to 256.

Although the contents of the region ID are partially changed in this manner, the number of bytes of 52 in the region ID or the number of bytes of 1360/746 per sector is not changed. By limiting the modification of the sector format of the optical disc 10 to the region of the sector number indication, interchangeability with the conventional optical disc may be achieved, while certain manufacture process may be carried out simultaneously in the manufacture of optical disc to facilitate manufacture of optical discs.

If, with the total number of tracks on the optical disc of, for example, $32768=2^{15}$, the data recording region is subdivided into recording zones each containing $2^{13}$ ($=8192$) tracks, the upper two bits of the 15 track addresses may be directly used as the zone address. The data recording regions resulting from subdividing the entire data recording region into four may perpetually be checked by the upper two bit zone address to facilitate controlling. However, since the total number of tracks is usually not $2^n$, fractional number tracks are produced. These fractional number tracks are included in the last recording zone for adjustment.

The optical disc 20 shown in FIG. 5 has its recording region subdivided into two recording zones, with the number of the recording zones N being 2 ($N=2$). The first recording zone $Z_0$ has 8192 ($=2^{13}$) tracks of from 0th track $T_0$ to 8192nd track $T_{8191}$. Thus the second recording zone $Z_1$ is composed of the remaining 10559 tracks. Since the distance from the center of the optical disc to the inner most radius $R_1=30$ mm, the second recording zone $Z_1$ has a boundary radius $R_2$ $$R_2 = 30 + 2^{13} \times 1.6 \ \mu m = 43.1 mm$$

After subdivision the inner most recording zone $Z_0$ of the recording region has the number of sectors per track $K_1$ of 17 sectors ($K_1=17$) which is the usual setting number of sectors per track. The number of sectors $K_2$ per track in the outer most recording zones $Z_1$ is $$K_2 = 17 \times (43/30) = 24.3$$

sectors.

The number of tracks possessed by one recording zone is $18751/2 = 9375.5$ tracks. In the outer most recording zone $Z_1$, the circumferential recording zone is subdivided into 25 equal parts (number of sectors $K_2=25$). The total number of recording bits per sector $m_R$ is set to 1K bytes = 1024 bytes.

The maximum recording density in the recording zone $Z_0$ is 1.02 $\mu$m/bit, in terms of a reciprocal of the recording density. Similarly, the maximum recording density in the recording zone $Z_1$ is 1.04 $\mu$m/bit, in terms of a reciprocal of the recording density. In both zones, the number of bits in a sector having the maximum recording density is $1360 \times 8$ bits.

With the present optical disc, the track pitch TP is set to 1.6 $\mu$m. The relation between the track pitch TP and the relative quantity of the tracking signal is plotted in FIG. 6 for the laser wavelength $\lambda = 780$ nm. It is seen that, if the relative quantity of the tracking signals of the order of 0.5 or more is a reference value to be adopted in the optical disc, the track pitch TP of 1.3 $\mu$m or more represents a range suited for general application.

FIG. 7 shows the relation between the recording density and the error rate. The relation between the recording density and the error rate shown in FIG. 7 shows that for the current laser wavelength $\lambda = 780$ nm and 2-7 data modulation. Since a satisfactory error rate of $10^{-5}$ may be maintained under these conditions with the bit length of 0.7 $\mu$m or more, the above-mentioned bit length in the laser wavelength is set as a reasonable recording density.

The following explanation is given of a 5.25 inch optical disc of the above-mentioned ISO standard ISO/IEC DIS 10089 in which the radius $R=30$ to 60 mm is set as a recording region and the track pitch is set to 1.4 $\mu$m. The total number of tracks in the recording region of a width of 30 mm is 21428.

Figure 8:
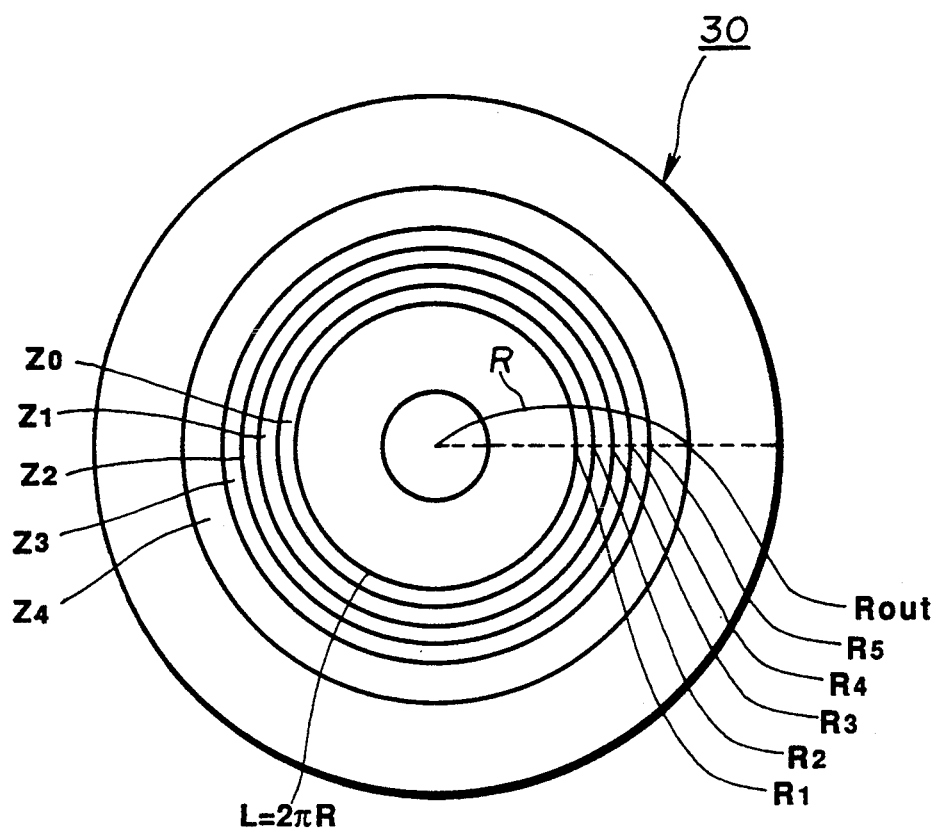
FIG. 8 is a schematic view showing an example in which an optical disc according to the present invention is applied to a 5.25 inch optical disc.

In this case, an optical disc 30 shown in FIG. 8 has its recording region subdivided into five recording zones ($N=5$), with the number of the tracks per recording zone of 4096 ($=2^{12}$).

Since the radius $R_1$ is 30 mm, a boundary radius $R_2$ between a first zone $Z_0$ and a second zone $Z_1$, that is a first boundary, is given by $$R_2 = 30 + 2_{12} \times 1.4 \ \mu m = 35.734 \ mm$$

In the inner most recording zone $Z_0$ of the optical disc 30, thus subdivided into the recording zones, the maximum recording density is 0.825 $\mu$m/bit and the number of sectors per track $K_1$, which is equivalent to circumferential graduation, is set to 21 ($K_1=21$).

It is seen that, in the outer most recording zone $Z_4$, the number of sectors per track $K_2$ is given by formula (6) by $$K_2 = 21 \times (35.7/30) = 25$$

The ranges of disc radii indicating the boundaries between the recording zones, the number of tracks and the number of sectors in the recording zones, are shown in Table 1. It is noted that the fractional numbers of the tracks produced on subdivision into 4096 tracks have been added to the number of tracks in the outer most recording zone $Z_4$ shown in Table 1.

TABLE 1

| ZONE NOS. | DISC RADIUS RANGE FOR ZONES (mm) | NUMBER OF TRACKS/ZONE | NUMBER OF SECTORS/TRACK |
|---|---|---|---|
| 0 | 30.000~35.734 | 4096 | 21 |
| 1 | 35.734~41.468 | 4096 | 25 |
| 2 | 41.468~47.203 | 4096 | 29 |
| 3 | 47.203~52.938 | 4096 | 33 |
| 4 | 52.938~59.999 | 5044 | 37 |

If the number of bytes per sector is 512, the above parameters for an optical disc 30 may be calculated in the same manner as above by setting the reciprocal of the maximum recording density to 0.817 $\mu$m/bit and the number of sectors per track $K_1$, equivalent to circumferential graduations, to 38 ($K_1=38$) in the Inner most zone $Z_0$. These parameters are shown in Table 2. In such case, the number of sectors exceeds $2^6=64$. For coping with this, the sector number indication is set to 8 bits = 256.

TABLE 2

| ZONE NOS. | DISC RADIUS RANGES FOR ZONES (mm) | NUMBER OF TRACKS/ZONE | NUMBER OF SECTORS/TRACK |
|---|---|---|---|
| 0 | 30.000~35.734 | 4096 | 38 |
| 1 | 35.734~41.468 | 4096 | 46 |
| 2 | 41.468~47.203 | 4096 | 53 |
| 3 | 47.203~52.938 | 4096 | 60 |
| 4 | 52.938~59.999 | 5044 | 68 |

If the number of bytes per sector is set to 1024 bytes or to 512 bytes, the recording capacity may be increased from the current recording capacity of 326M bytes to 644M bytes and from the current recording capacity of 293M bytes to 588M bytes, respectively, so that the recording capacity may be nearly doubled as compared to that of the current optical disc.

Meanwhile, the optical disc of the present invention is not limited to the above embodiment, but may be modified in accordance with the circumferential recording density and the number of the recording zones.

For example, if the numbers of sectors of the recording zones $Z_0$ to $Z_4$ from the inner most side are set to $K_1=21$, $K_2=25$, $K_3=28$, $K_4=32$ and $K_5=36$, respectively, with the track pitch TP of 1.3 μm and with the remaining parameters being the same as above, the total recording capacity of the recording medium is 692M bytes for the capacity per sector of 1K byte. The reciprocal of the maximum recording density is 0.816 μm/bit.

If the track pitch TP is 1.3 μm and the recording capacity 644M bytes which is the same as above, the maximum recording capacity is 0.87 μm/bit. The number of sectors are then $K_1=19$, $K_2=23$, $K_3=26$, $K_4=30$ and $K_5=34$, respectively.

The recording capacity may be increased in this manner by increasing the number of the recording capacity.

On the other hand, the maximum recording density in the recording zone $Z_0$ is 1.02 μm/bit in terms of the reciprocal of the recording density. Similarly, the maximum recording density in the recording zone $Z_0$ is 1.04 μm/bit in terms of the reciprocal of the recording density. In both of these recording zones, the number of bits in the sector having the maximum recording density is 1360×8 bits.

By subdividing the recording area of the optical disc into plural recording zones, the data recording capacity may be increased to 402M bytes from the recordable data volume of 326M bytes according to the customary ISO/IEC DISC 10089 standard if 1K byte may be recorded in each sector. By the above method, the number of powers n of $2^n$ indicating the number of tracks by which the recording area is divided into recording zones may be selected freely. Above all, by changing over the recording zones by a number equal to a power of 2 of the number of tracks, the recording zones may be changed over easily by using only several upper order bits of a digital discriminating signal if such discriminating signal is used. In this manner, a large quantity of data may be recorded and/or reproduced stably and accurately by a simple technique.

Figure 1:
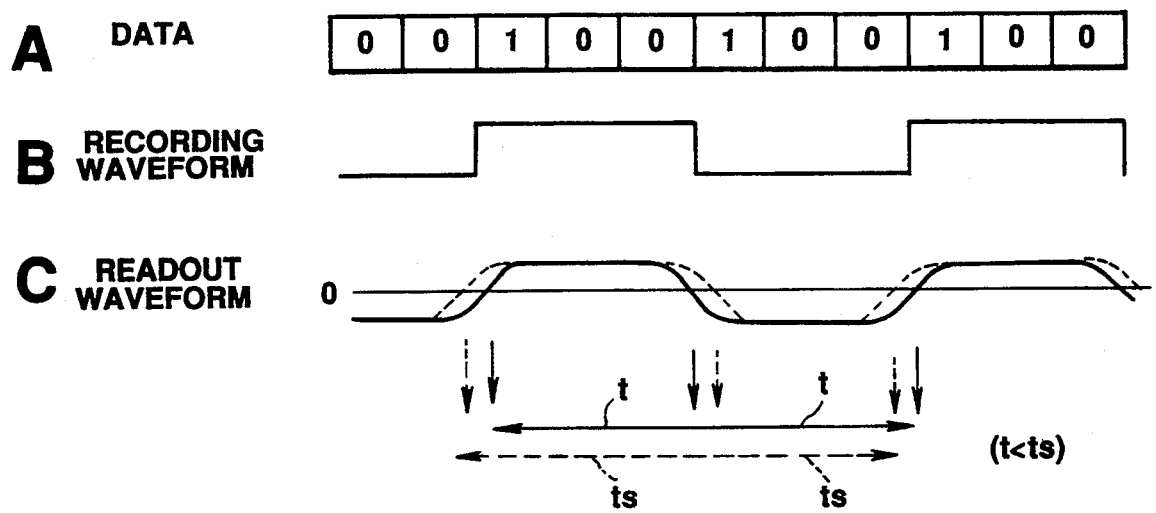
FIG. 1A-1C show a recording system for recording on a conventional optical disc by utilizing a light modulation system and mark length recording.
Figure 9:
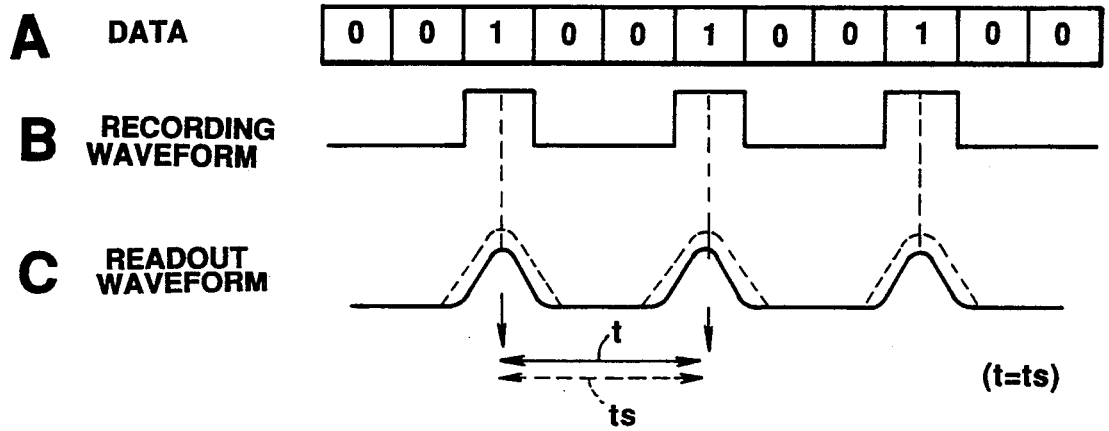
FIG. 9A-9C are explanatory views showing a recording system in which recording on an optical disc is made by utilizing a light modulation system and pit position recording.
Figure 10:
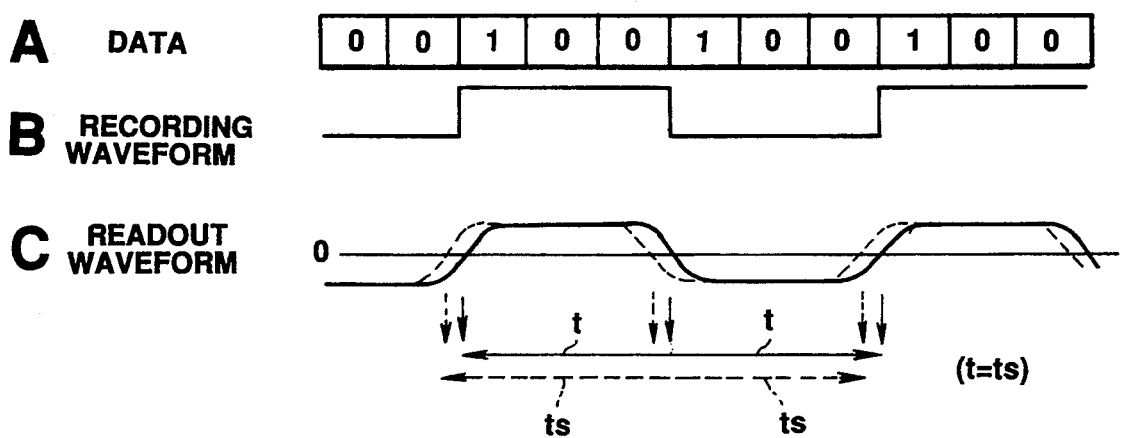
FIG. 10A-10C are explanatory view showing a recording system in which recording on an optical disc is made by utilizing a magnetic field modulation system and mark length (or edge) recording.

The recording system of recording data on an optical disc is explained by referring to FIGS. 9, 10 and 1.

FIG. 1 shows recording by a light modulating system and a mark length recording system. With fluctuations in the laser power or the intensity of an external magnetic field, a distance t between zero-crossing points of the recording data readout waveform is changed, so that, if the laser power or the intensity of the magnetic field larger than usual values is applied, the distance $t_s$ between the zero-crossing points since signal rise until signal decay may become larger than t ($t<t_s$) which may present itself as jitter.

On the contrary, with the light modulation system, jitter may be inhibited by employing a pit position recording system. In accordance with the pit position recording system, recording data shown in FIG. 9A are necessarily recorded by inserting "0" between recording data "1", as may be seen from the recording waveform of FIG. 9B. During recording, light modulation may be applied with the 50% duty position of the recording data "1" in the recording waveform shown in FIG. 9B as the center position.

By recording in this manner, and detecting the peak position of the readout waveform of the recording data as shown in FIG. 9C, the distance $t_s$ fluctuated with the laser power or the intensity of the external magnetic field may be set so as to be equal to the distance t between peak positions ($t=t_s$), thus without depending on fluctuations such as $t_s$ between zero-crossing points between signal rise and signal decay as shown in FIG. 1C, so that a waveform which is the same as the waveform shown in FIG. 9B may be outputted to overcome the problem of jitter.

If the magnetic field modulation system is adopted, the mark length (or edge) recording is preferred. With this recording, the waveform shown in FIG. 10B ia reversed from the temporally preceding level depending on level transitions from "0" to "1" of the recording data shown in FIG. 10A (mark length recording). With the magnetic field modulating system, the waveform rise and fall timing is changed depending on the strength of magnetism. Therefore, although phase deviations are produced with this magnetic field modulating system when the strength of the magnetic field is changed, the distance between the zero-crossing points $t_s$ may be recorded with the same distance as the mark length (distance between edges) t conforming to data.

By recording in this manner, if attention is directed to the rising and falling edges of the readout waveform of the recording data during readout shown in FIG. 10C, the distance $t_s$ between zero-crossing points fluctuated depending on the laser power or the intensity of the external magnetic field may be outputted with the same distance as the mark length (edge-to-edge distance) t conforming to the recording data ($t=t_s$) to overcome the problem of jitter.

Figure 11:
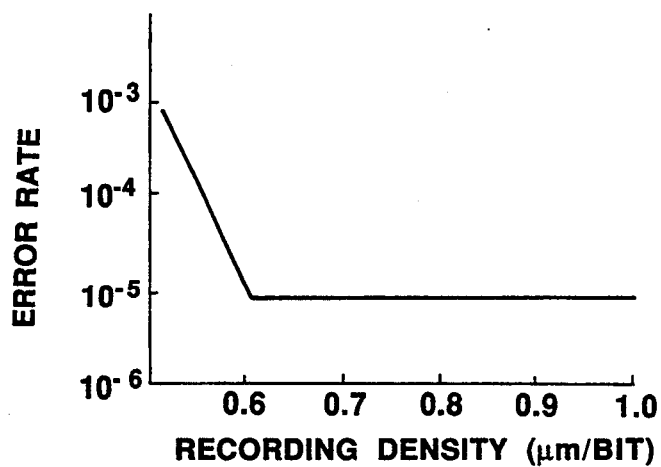
FIG. 11 is a graph showing the relation between the recording density of an optical disc and an error rate.
Figure 13:
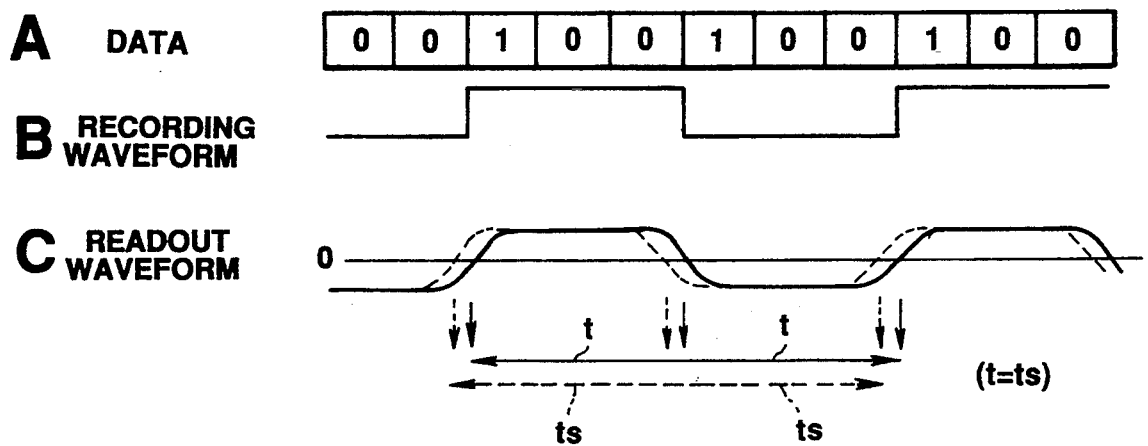
FIG. 13A-13C are explanatory views showing a recording system in which recording on an optical disc is made by utilizing a magnetic field modulation system and mark length (or edge) recording.
Figure 12:
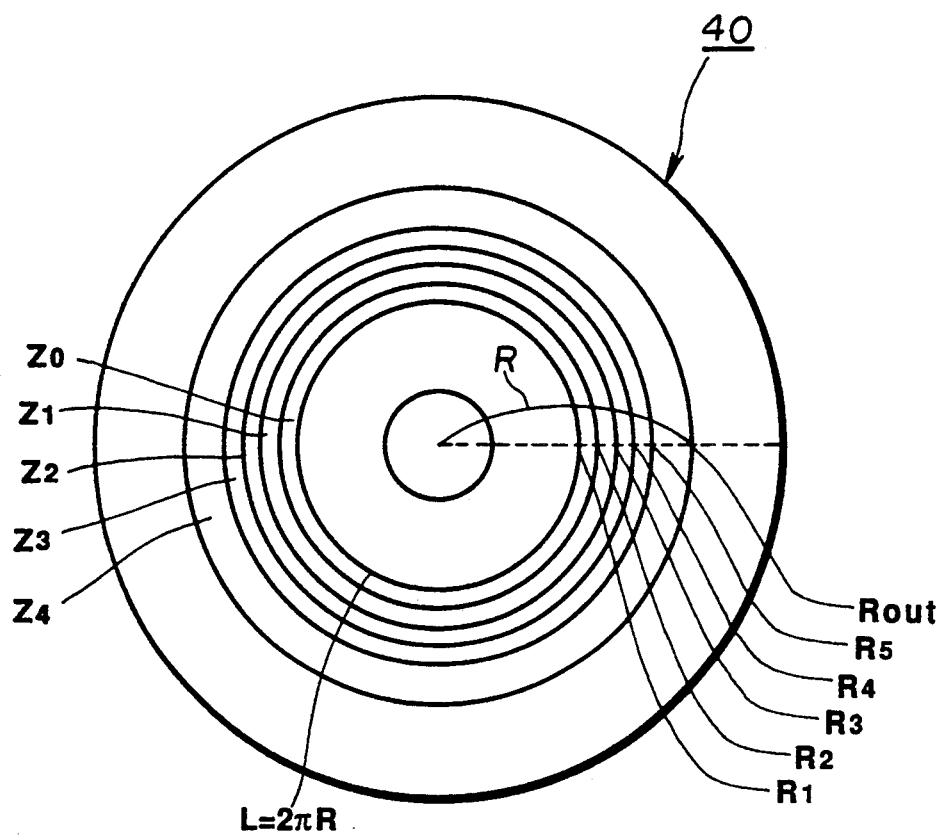
FIG. 12 is a schematic view showing a more concrete second embodiment in which an optical disc according to the present invention is applied to a 3.5 inch optical disc.

Referring to FIGS. 11 to 13, an optical disc according to a more concrete second embodiment of the present invention, and a method of recording on the disc, are explained.

According to a conventional physical format for a 3.5 inch optical disc, among the parameters of this system, the track pitch and the reciprocal of the circumferential recording density are set to 1.6 μm and 1.0 μm/bit, respectively.

With the optical disc according to the present invention, the physical format of the 3.5 inch optical disc is such that the track pitch is narrower than 1.6 μm for that of a 3.5 inch optical disc according to the conventional ISO/IEC 10090 standard of the International Organization for Standardization, the reciprocal of the line recording density of the recording tracks in the circumferential direction is set to 1.0 to 0.6 μm/bit, the recording region of the optical disc is subdivided into plural recording zones at intervals of plural tracks, the number of the recording zones is set to 2 to 10 and recording is carried out according to an edge recording system. By such constitution and recording, the recording capacity may be rendered equal from track to track in each recording zone and the recording capacity per track may be rendered different from one recording zone to another, while the line recording density may be rendered substantially equal from one recording zone to another. The recording capacity of the CAV system optical disc may be increased significantly (see the schematic drawing showing the principle of FIG. 2).

With the 3.5 inch optical disc of the present invention, the parameters which have to be changed in connection with the above given parameters are selected to be substantially equal to those of the 3.5 inch optical disc of the ISO/IEC 10090 standard of the conventional International Organization for Standardization, in order to maintain high interchangeablity with the ISO/IEC 10090 standard optical disc.

As a concrete example, setting of the parameters of the continuous servo tracking system (CCS) of the ISO/IEC 10090 standard is explained by giving numerical values.

As for the sector format of the optical disc 10 of the ISO/IEC 10089 standard, each sector is made up of an address part of 52 bytes, a flag part of 14 bytes, a data part of 639 bytes and a buffer part of 20 bytes, totalling 725 bytes. In the address part composed of 52 bytes, a region ID for recording the address information is made up of 3 bytes. The 3-byte region ID is composed of two bytes as a track number and one byte as a sector number. Data of the region ID are modulated in accordance with 2-7 modulation.

Among the current 5.25 inch optical discs according to the ISO/IEC 10089 standard of the International Organization for Standardization, there is an optical disc with 128M bytes per side. The number of sectors per recording track in each recording zone except the inner most recording zone of the optical disc of the present invention is represented by a ratio of an inner radius to an outer radius of each recording zone from the center of the optical disc multiplied by the original number of sectors, so that the recording density will be approximately equal from one recording zone to another, as will be explained subsequently.

The above-mentioned region ID as well as the region CRC for recording error correction code for the region ID is written thrice within the address part. In the currently used two types of the optical discs, the maximum number of sectors per track is 25 or less and 6 bits are used for indicating the number of sectors.

However, with the above-mentioned format, the number of sectors is larger than the number of sectors per track of 25 of each of the above-mentioned two types of the optical disc. For this reason, the 2 bits of the ID field for sector number indication are not used as above, but are used for sector number indication, so that the sector number may be indicated by a total of 8 bits for up to 256.

Although the contents of the region ID are partially changed in this manner, the number of bytes of 52 in the region ID or the number of bytes of 1360/746 per sector is not changed. By limiting the modification of the sector format of the optical disc 10 to the region of the sector number indication, interchangeability with the conventional optical disc may be achieved, while certain manufacture process may be carried out simultaneously in the manufacture of optical discs to facilitate manufacture of optical discs.

With the present optical disc, the track pitch TP is set to 1.6 μm. The relation of the relative signal quantity to the track pitch TP is the same as that shown in FIG. 6 for the laser wavelength λ=780 nm. It is seen that, if the relative quantity of the tracking signals of the order of 0.5 or more is a reference value to be adopted in the optical disc, the track pitch TP of 1.3 μm or more represents a range suited for general application.

FIG. 11 shows the relation between the recording density and the error rate. The relation between the recording density and the error rate shown in FIG. 11 shows that for the current laser wavelength λ=780 nm and 2-7 data modulation. Since a satisfactory error rate of $10^{-5}$ may be maintained under these conditions with the bit length of 0.7 μm or more, the above-mentioned bit length in the laser wavelength is set as a reasonable recording density.

Based on the above-mentioned principle, the optical disc as a recording medium shown in FIG. 12 and the recording method are explained by referring to a more concrete example.

The 5.25 inch optical disc of the above-mentioned ISO standard has a range of radius R=24 to 40 mm as a recording region and a track pitch of 1.4 μm. Thus the total number of tracks in the recording region having a width of 16 mm is 11428.

In this case, an optical disc 4 shown in FIG. 12 has its recording region subdivided into five recording zones (N=5), with the number of the tracks per recording zone of 4096 ($=2^{12}$). Since the radius $R_1$ is 24 mm, a boundary radius $R_2$ between a first zone $Z_0$ and a second zone $Z_1$, that is a first boundary, is given by $$R_2 = 24 + 2^{11} \times 1.4 \ \mu m = 26{,}867 \ mm$$

In the inner most recording zone $Z_0$ of the optical disc 40, thus subdivided into the recording zones, the reciprocal of the maximum recording density is 0.743 μm/bit and the number of sectors per track $K_2$, which is equivalent to circumferential graduation, is set to 35 ($K_1 = 35$). It is seen that, in the outer most recording zone $Z_1$, the number of sectors per track $K_2$ is given by formula (6) by $$K_2 = 35 \times (26.8/24) = 34$$

The disc radius ranges indicating the boundaries between the recording zones, the number of tracks and the number of sectors in the recording zones, are shown in Table 1. It is noted that the fractional numbers of the tracks produced on subdivision into 2048 tracks have been added to the number of tracks in the outer most recording zone $Z_4$ shown in Table 3.

TABLE 3

| ZONE NOS. | DISC RADIUS RANGE FOR ZONES (mm) | NUMBER OF TRACKS/ZONE | NUMBER OF SECTORS/ TRACK |
|---|---|---|---|
| 0 | 24.000~26.867 | 2048 | 35 |
| 1 | 26.867~29.734 | 2048 | 39 |
| 2 | 29.734~32.602 | 2048 | 43 |
| 3 | 32.602~35.468 | 2048 | 47 |
| 4 | 35.468~39.999 | 3236 | 51 |

The sector number indication is set to 8 bits=256, for coping with a situation in which the number of sectors exceeds $2^6 = 64$.

The recording system is by mark length recording (edge recording) by 2-7 modulation capable of high density recording.

If the total number of recording bits per sector $m_R$ is set to 512 bytes, the recording capacity is increased to about twice that of the current optical disc, more specifically, to 257M bytes as compared to 128M bytes of the current optical disc.

Meanwhile, the optical disc of the present invention is not limited to the above embodiment, but may be modified in accordance with the track pitch, circumferential line recording density, number of the recording zones and parameters of edge recording.

For example, pit position recording may be adopted in place of the above-mentioned edge recording. If the numbers of sectors of the recording zones $Z_0$ to $Z_4$ from the inner most side are set to $K_1=35$, $K_2=39$, $K_3=43$, $K_4=47$ and $K_5=51$, respectively, with the track pitch TP of 1.3 μm in place of 1.4 μm, with the remaining parameters being the same as above, the total recording capacity of the recording medium is about 280M bytes for the capacity per sector of 512 bytes. The reciprocal of the maximum recording density is 0.743 μm/bit.

If the track pitch TP is 1.3 μm and the recording capacity is 257M bytes which is the same as above, the maximum recording capacity is 0.81 μm/bit. The number of sectors are then $K_1=32$, $K_2=36$, $K_3=40$, $K_4=44$ and $K_5=48$, respectively.

The recording capacity may be increased in this manner by increasing the number of zones.

If, under the above-mentioned conditions, the number of recording zones N is increased from N=5 to N=10, so that each of the zones is composed of 1024 tracks, the numbers of sectors per track of the recording zones are $K_1=35$, $K_2=37$, $K_3=39$, $K_4=41$, $K_5=43$, $K_6=46$, $K_7=47$, $K_8=49$, $K_9=51$ and $K_{10}=54$. By such partitioning, the recording capacity may be increased from 257M bytes to 264M bytes.

By subdividing the recording region of the optical disc into plural recording zones in this manner, the data recording capacity may be increased to 257M bytes from the recordable data volume of 128M bytes according to the customary ISO/IEC DISC 10089 standard if 1K byte may be recorded in each sector. By the above method, the number of powers n of $2^n$ indicating the number of tracks by which the recording region is divided into recording zones may be selected freely.

Above all, by changing over the recording zones by a number equal to a power of 2 of the number of tracks, the recording zones may be changed over easily by using only several upper order bits of a digital discriminating signal if such discriminating signal is used. In this manner, a large quantity of data may be recorded and/or reproduced stably and accurately by a simple technique.

The recording system of recording data on an optical disc explained by referring to FIGS. 13 and 1.

FIG. 1 shows recording by a light modulating system and a mark length recording system. With fluctuations in the laser power or the intensity of an external magnetic field, a distance t between zero-crossing points of the recording data readout waveform is changed, so that, if the laser power or the intensity of the magnetic field larger than usual values is applied, the distance $t_s$ between the zero-crossing points since signal rise until signal decay may become larger than t ($t<t_s$) which may present itself as jitter.

Such jitter may be inhibited by employing a magnetic field modulating system and mark length recording (edge recording). The recording waveform, shown in FIG. 13B, of recording data shown in FIG. 13A is inverted from the preceding level with level transition from "0" to "1" of the recording data (mark length recording). The magnetic field modulating system is a system in which the waveform rise and decay timings are changed depending on the intensity of magnetism. Thus, although phase deviations are produced when the strength of the magnetic field is changed, the distance between zero-crossings $t_s$ may be recorded with the same constant value as that of the mark length (edge-to-edge distance) t with the present magnetic field modulation system.

By recording in this manner, if attention is directed to the rising and falling edges of the readout waveform of the recording data during readout shown in FIG. 10C, the distance $t_s$ between zero-crossing points fluctuated depending on the laser power or the intensity of the external magnetic field may be outputted with the same distance as the mark length (edge-to-edge distance) t conforming to the recording data ($t=t_s$) to overcome the problem of jitter.

Besides, the magnetic field modulation system and the mark length or edge recording are effective techniques when recording with high density, that is when performing recording using high frequency signals.

Figure 14:
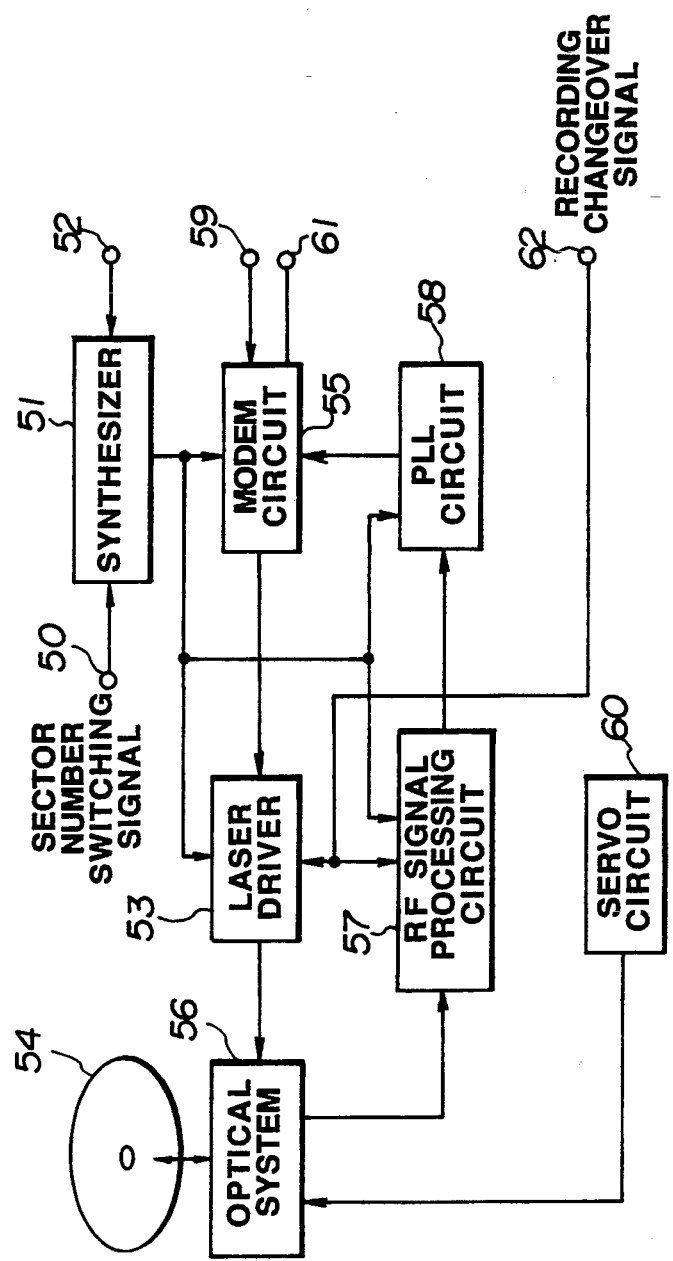
FIG. 14 is a schematic block diagram showing a driving apparatus for driving both an optical disc of the present invention and a current optical disc.

A driving apparatus for recording and/or reproducing information signals on or from an optical disc of the present invention is shown in a schematic block diagram of FIG. 14.

The block diagram of FIG. 14 shows a schematic constitution of the driving apparatus for driving both the optical disc of the present invention and the current optical disc.

A user-designated sector changeover signal is supplied to a synthesizer 51 via an input terminal 50. The sector changeover signal is an ID signal indicating each recording zone or a signal indicating if an optical disc 54 is an optical disc constituted in accordance with the current physical format or an optical disc constituted in accordance with the conventional recording format. As data indicating the disc type, the information concerning the disc type is written in the form of so-called bar code in a phase encoder part (PEP) at an inner most circumference of the optical disc. It is by these data that the sector changeover signal is produced.

Reference clocks conforming to the sector changeover signals are supplied to a synthesizer 51 via an input terminal 52. The synthesizer 51 transmits the sector changeover signals and control signals generated by the reference clocks to a laser driver part 53 adapted for driving control of a laser light, a modulation/demodulation circuit 55 for modulating recording data supplied to the optical disc 54 and demodulating playback data from the optical disc 54, an RF signal processing circuit 57 for processing RF signals converted by an optical system 56 from light signals from the optical disc 54 and to a phase lock loop (PLL) 58.

The modulation/demodulation circuit 55 effectuates data modulation in accordance with data supplied via input terminal 59 from a controller, not shown, and control signals, for supplying modulated data to a laser driver 53. The laser driver 53 radiates a laser light for writing data on the optical disc 54 via an optical system 56. The outgoing laser light is controlled in intensity depending on the return laser light reflected from the surface of the optical disc 54. The return light is supplied to a servo circuit 60 for servo-controlling e.g. the position of the optical system 56.

During data reproduction, the laser light reflected from the optical disc is converted by the optical system 56 into RF signals. These output RF signals are supplied to the RF signal processing circuit 57. These Rf signals are processed into binary signals, depending on control signals supplied from synthesizer 51, and processed with waveform equalizing operation before being supplied to the PLL circuit 58 which also is controlled depending on control signals supplied from synthesizer 51. The reproduced binary output signals from PLL circuit 58 are transmitted to the modulation/demodulation circuit 55 which demodulates the reproduced signals to output the demodulated playback signals to a controller, not shown, via an output terminal 71.

By generating control signals conforming to the number of sectors of the optical disc 54 and supplying the generated signals o various operating parts, a driving apparatus is provided which may be interchangeably employed for an optical disc constituted in accordance with the physical format of the present invention and an optical disc constituted in accordance with the current physical format, Since the user my be safeguarded by the present driving apparatus against confusion otherwise produced by the difference in the physical format of the optical disc, a promising outlook is opened for the market for an optical disc.

What is claimed is:

1. An optical disc having formed thereon plural tracks for recording information data and comprising:
    a recording region subdivided into plural recording zones each having $2^n$ tracks, n being an integer natural number, with each track in a given recording zone having a same recording capacity which is different from a recording capacity of tracks in different recording zones, and wherein a line recording density within the recording zones is approximately equal.

2. A recording method according to claim 1, wherein the information data are recorded in accordance with a magnetic field modulating system which is a system consisting in changing a waveform rise and fall timings depending on an intensity of a recording magnetism.

3. A recording method according to claim 1, wherein the information data are recorded in accordance with a mark length recording system which is a system consisting in inverting a level of a recording waveform.

4. A recording method according to claim 1, wherein the information data are recorded in accordance with an edge recording system which is a system consisting in recording based on a rising and a falling edge of a readout waveform of recording data during readout.

5. An optical disc having recording tracks formed thereon, in which information data are recorded, at a pitch narrower than 1.6 μm, wherein the improvement comprises:
    that a reciprocal of a line recording density of circumferential recording tracks is 1.0 to 0.6 μm/bit, and wherein
    that a recording region on which information data are recorded according to an edge recording system is subdivided into 2 to 10 recording zones at intervals of plural tracks.

6. A method for recording on an optical disc, comprising the steps of:
    forming a plurality of tracks on the optical disc, the tracks having a pitch narrower than 1.6 μm,
    forming each track to have a reciprocal of a line recording density in a circumferential direction to be 1.0 to 0.6 μm/bit, and
    subdividing a recording region of the optical disc into 2 to 10 recording zones at intervals of plural tracks and
    carrying out recording according to an edge recording system.

7. A method for recording information data in a recording region of an optical disc comprising the steps of:
    subdividing the recording region of the optical disc into plural recording zones each having $2^n$ tracks, n being an integer natural number, and
    recording the information data so that each track in a given recording zone has a same recording capacity, which is different from a recording capacity of tracks in the other recording zones of the plurality of recording zones, and a line recording density within the recording zones is substantially equal.

8. An optical disc having recording tracks formed thereon on which information data are recorded, wherein the improvement comprises:
    that the tracks are formed at a pitch narrower than 1.6 μm, a reciprocal of a line recording density of circumferential recording tracks is 1.0 to 0.7 μm/bit, and
    wherein a recording region on which the information data are recorded is subdivided into 2 to 10 recording zones at intervals of plural tracks.

9. A method for recording information data in a recording region of an optical disc on which plural recording tracks are formed, comprising the steps of:
    forming the recording tracks so that the recording tracks have a pitch narrower than 1.6 μm,
    forming circumferential recording tracks to have a reciprocal of a line recording density of 1.0 to 0.7 μm/bit, and
    subdividing each recording zone into plural tracks, the number of the recording zones being 2 to 10.

* * * * *